United States Patent [19]

Tiedeke

[11] Patent Number: 5,102,220
[45] Date of Patent: Apr. 7, 1992

[54] PULSE DELAY MEASURING CIRCUIT
[75] Inventor: Joachim Tiedeke, Heerbrugg, Switzerland
[73] Assignee: Leica Heerbrugg AG, Heerbrugg, Switzerland
[21] Appl. No.: 609,749
[22] Filed: Nov. 6, 1990
[30] Foreign Application Priority Data
Nov. 14, 1989 [DE] Fed. Rep. of Germany ....... 3937787
[51] Int. Cl.$^5$ .......................... G01C 3/08; G01S 13/08; G01S 15/00; H03D 1/00
[52] U.S. Cl. .......................................... 356/5; 342/91; 342/135; 367/98; 375/94; 375/99
[58] Field of Search .................... 367/98; 342/91, 135; 356/5; 375/94, 99

[56] References Cited
U.S. PATENT DOCUMENTS

| 3,164,661 | 1/1965 | Dellon | 356/5 |
| 3,503,680 | 3/1970 | Schenkerman | 356/5 |
| 3,954,335 | 5/1976 | Bodlaj | 356/5 |

FOREIGN PATENT DOCUMENTS 2845164 12/1983 Fed. Rep. of Germany .
3620226 7/1987 Fed. Rep. of Germany .

Primary Examiner—Stephen C. Buczinski
Attorney, Agent, or Firm—Foley & Lardner

[57] ABSTRACT

A method of measuring a distance to an object includes generating first signal pulses to be bounced off the object and receiving the first signal pulses, after the first signal pulses have been bounced off the object, as second signal pulses. When the amplitude of the second signal pulses is above a predetermined value, the second signal pulses are differentiated and then supplied as differentiated second signal pulses to an input of an analog-to-digital converter. When the amplitude of the second signal pulses is not above the predetermined value, the second signal pulses are passed through to the input of the analog-to-digital converter unchanged. Signal pulses at the input to the analog-to-digital converter are converted into digital signals. The digital signals are summed over a period of time to generate a sum. The sum is used to determine the time delay between generating the first signal pulses and receiving the second signal pulses. The time delay is proportional to the distance to the object.

12 Claims, 6 Drawing Sheets

PULSE DELAY MEASURING CIRCUIT

BACKGROUND OF THE INVENTION

The invention is directed to a pulse delay measuring circuit used for measuring the distance to an object.

A pulse delay measuring circuit is discussed in German Publication DE 36 20 226, published July 2, 1987. The circuit disclosed in this German Publication is suitable for laser range finders having a low transmitting pulse energy for the measurement of small, distant, weakly-reflecting, objects.

Under these conditions, the received pulses are very weak and are in some cases smaller than noise signals. An analog-to-digital converter and a parallel adder having a low number of bits is used to improve the signal-to-noise ratio. An advantage of processing a low number of bits is that the processing speed is fast and the circuitry is simple and inexpensive.

If strong pulses are received due to a close or strongly reflecting object, the analog-to-digital converter or, after a few added-together pulses, the parallel adder will be overdriven. This results in the maximum value of the respective output signal being reached within several sampling pulse intervals. As a result, the determination of the peak signal position becomes uncertain.

In a target-locating and range-finding system disclosed in German Patent DE 28 45 164, issued Dec. 15, 1983 to Suzuki, a differentiator is used continuously during digital processing of received pulses.

SUMMARY OF THE INVENTION

It is an object of the instant invention, therefore, to provide a pulse delay measuring circuit in which the measuring accuracy is not impaired, even for large amplitude received pulses.

It is a further object of the invention to improve the measuring accuracy of pulse delay measuring circuits.

According to a first aspect of the invention, the invention provides a pulse delay measuring circuit which includes a signal pulse transmitter to generate first signal pulses to be bounced off an object and a receiver receiving the first signal pulses after the first signal pulses have been bounced off the object as second signal pulses. A logic circuit receives the second signal pulses and compares an amplitude of the second signal pulses with a predetermined value. A differentiating circuit, which is coupled to the logic circuit, generates an output signal corresponding to a derivative of an input signal. An analog-to-digital converter converts inputted analog signals into digital signals. A parallel adder, coupled to the analog-to-digital converter, adds the digital signals. The logic circuit switches in the differentiating circuit in between the receiver and the analog-to-digital converter, to differentiate the second signal pulses, for a duration of a plurality of trigger pulses when the amplitude of the second signal pulses reaches the predetermined value. The logic circuit switches out the differentiating circuit at the end of the duration.

According to another aspect of the invention, there is provided a method of measuring a distance to an object which includes generating first signal pulses to be bounced off the object and receiving the first signal pulses, after the first signal pulses have been bounced off the object, as second signal pulses. When an amplitude of the second signal pulses is above a predetermined value, the second signal pulses are differentiated and supplied as differentiated second signal pulses to an input of an analog-to-digital converter. When an amplitude of the second signal pulses is not above the predetermined value, the second signal pulses are passed through to the input of the analog-to-digital converter unchanged. Signal pulses at the input to the analog-to-digital converter are converted into digital signals. The digital signals are summed over a period of time to generate a sum. The sum is used to determine a time delay between generating the first signal pulses and receiving the second signal pulses.

Other objects, features, and advantages of the invention will be apparent from the detailed description below.

BRIEF DESCRIPTION OF THE DRAWINGS

The invention will be described in further detail with reference to the drawings, in which:

FIGS. 5a and 5b illustrate signals corresponding to the signals illustrated in FIGS. 3a and 3b, but with the differentiating element switched in; and FIGS. 6a and 6b illustrate signals corresponding to the signals illustrated in FIGS. 4a and 4b, but with the differentiating element switched in.

DETAILED DESCRIPTION OF THE PREFERRED EMBODIMENTS

To represent a differentiated signal digitally, use of fewer bits than the number of bits required for an undifferentiated signal is not necessarily satisfactory. However, a maximum of the undifferentiated signal corresponds to a zero transition between two extremes of the differentiated signal and the maximum position and accuracy of the differentiated signal are not influenced by overdriving an analog-to-digital converter. A similar technique known as delta modulation is used in the field of speech recognition.

FIGS. 2 to 6 are generated by computer simulations. In these simulations, statistical noise having a predetermined mean amplitude was superimposed on pulses of a predetermined shape and amplitude, as illustrated in FIGS. 2a and 2b. To produce FIGS. 3 to 6, the processing steps described below were simulated. Simulation was performed to make the representation more understandable. Simulation also takes into account the problems of extracting very fast low-energy signals, without interference, from the complex circuit.

In FIGS. 2 through 6, the abscissa specifies the object distance in meters. Distance is proportional to the time delay in accordance with: $distance = \frac{1}{2} \times velocity\ of\ light \times delay$.

Figure 1:
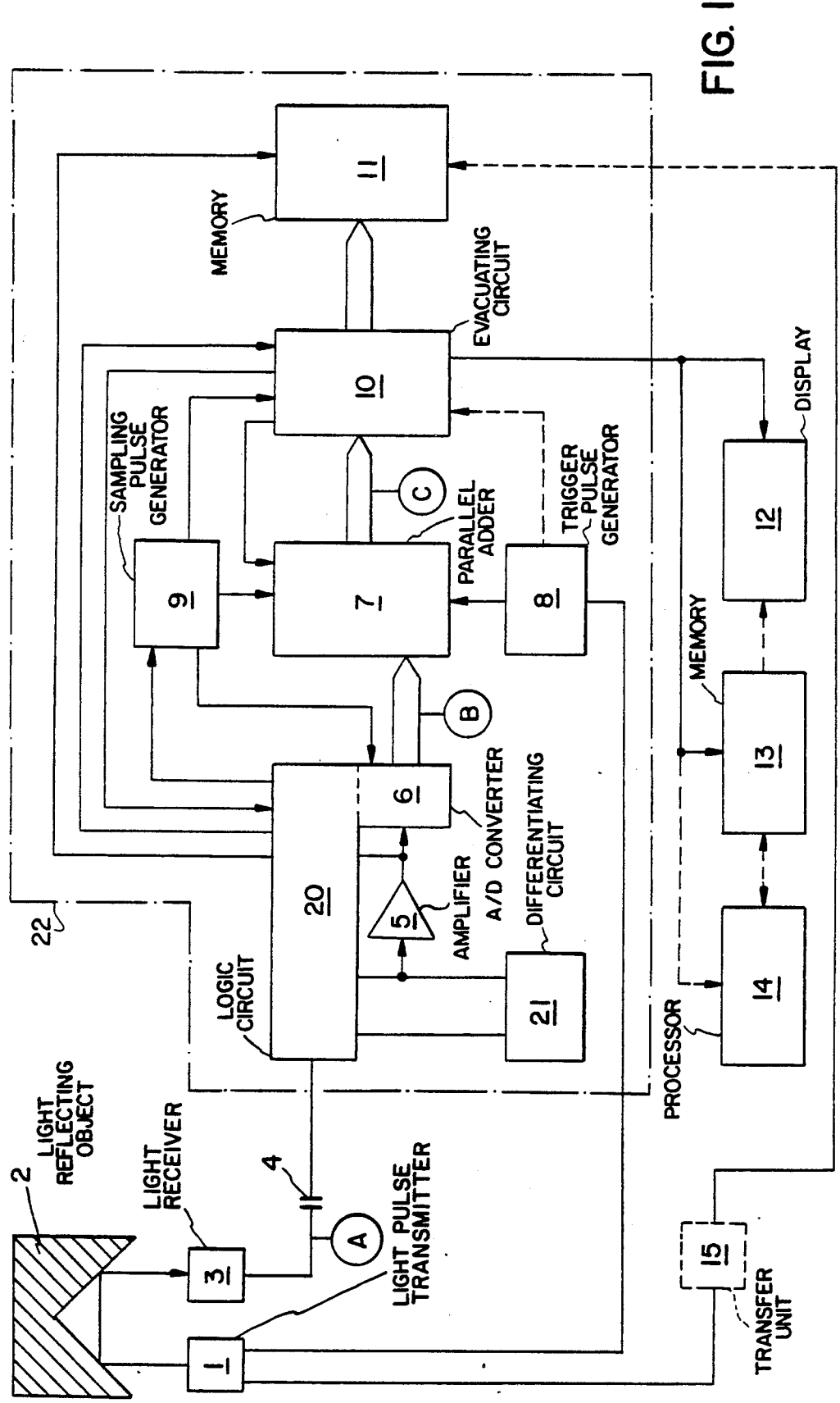
FIG. 1 illustrates a pulse delay measuring circuit according to a preferred embodiment of the invention.

FIG. 1 illustrates a light pulse transmitter 1, a light reflecting object 2, and a light receiver 3 which form an optical pulse delay measuring system. The light pulse transmitter 1 includes, for example, a GaAs laser diode with a power supply, pulse shaping circuitry for pulse shaping in the nanosecond range, and stabilization circuitry. The object 2 is shown as a triple reflector, that is, as a cooperative element. However, the invention is particularly advantageously used with arbitrary diffusely reflecting objects such as machine parts, buildings, and the like.

An avalanche photodiode with a power supply and circuitry to regulate the operating range is used as light receiver 3. Typically, light pulse transmitter 1 and light receiver 3 also contain optics for generating and receiving a suitably shaped transmitted and received light beam. Continuous-wave light components are suppressed by a capacitor 4 by coupling out signals capacitively. At point A, an electrical signal is present which contains the delay and intensity information of the received light pulse and an independent noise component.

The signal from capacitor 4 is then supplied via an amplifier 5 to an n-bit analog-to-digital converter 6. The analog-to-digital converter 6 preferably has a low number of bits, preferably only 1 bit. The digital signal B from the output of the analog-to-digital converter 6 is supplied to a parallel adder 7.

The light pulse transmitter 1, the parallel adder 7 and an evaluating circuit 10, which will be described in further detail below, are controlled by a trigger pulse generator 8 having a pulse rate in the kilohertz range.

The operating clock for the analog-to-digital converter 6 and for the parallel adder 7 is generated by a sampling pulse generator 9 having a pulse rate in the megahertz range and provides a timing standard for the evaluating circuit 10.

The parallel adder 7 has a number of channels which are sufficient to fully detect the received pulse for the greatest and the smallest range of the system. The number of channels is accordingly greater than the product of the greatest delay and the frequency of the sampling pulse generator 9.

The evaluating circuit 10 determines from the data field at point C, at the output of the parallel adder 7, the delay of the light pulse or equivalently the distance between receiver 3 and object 2, and forwards these values to a measurement value display 12, a measurement value memory 13 and/or a processor 14.

The evaluating circuit 10 is capable of determining the pulse delay by determining the channel having the maximum signal amplitude. However, correlation with a nominal data field for the pulse shape is preferred. As an alternative, interpolation with a suitable information function which reproduces the expected pulse shape can also be used. For this purpose, a memory 11 is provided for storing a nominal data field. Memory 11 can be, for example, a digital storage device.

The device 11 is also connected via a transfer unit 15 to light pulse transmitter 1 to extract for each measurement a nominal data field of the transmitted pulse. For this purpose, the transfer unit 15 can include a short light conductor and an arrangement corresponding to parts 3, 4, 5, and 6.

The arrangement described thus far is discussed further in German Publication DE 36 20 226.

Figure 2A:
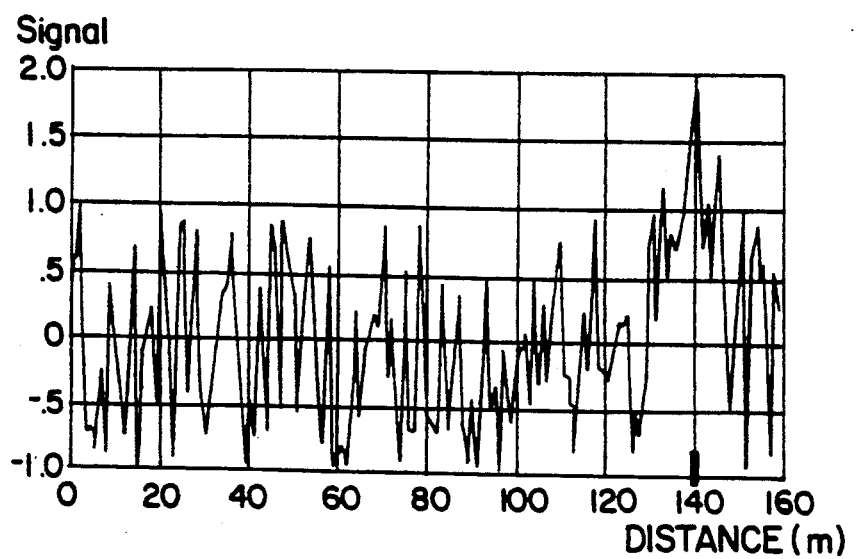
FIG. 2a illustrates an analog delay signal of a laser delay-type range finder at point A of FIG. 1 for a long distance (140 m)
Figure 3A:
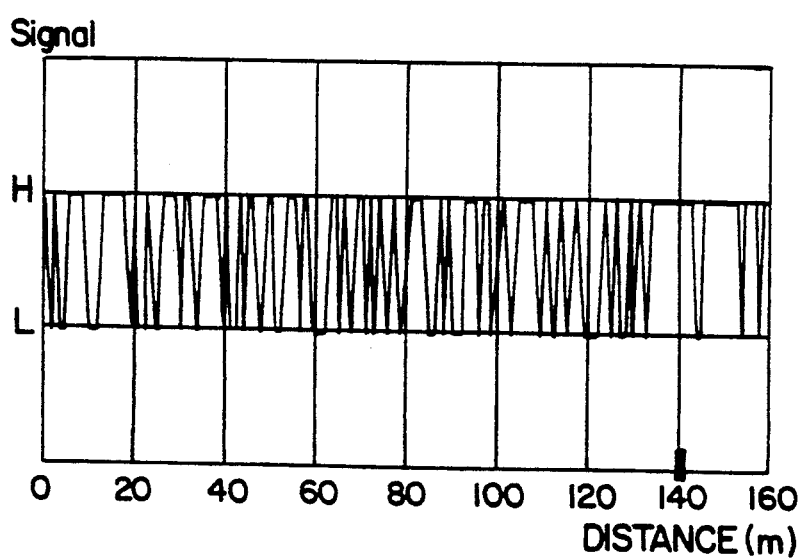
FIG. 3a illustrates a signal at point B of FIG. 1 after analog-to-digital conversion with the differentiating element switched out, for a long distance signal (140 m)
Figure 5A:
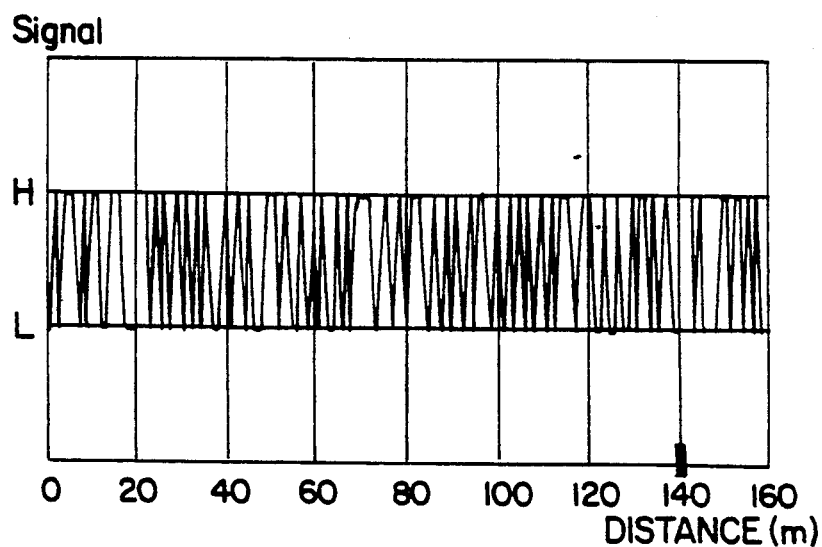

FIGS. 2a, 3a and 5a illustrate that in the circuit described above received signals with a poor signal-to-noise ratio, as illustrated in FIG. 2a, occurring at point A of FIG. 1 are markedly improved at point C at the output of the parallel adder 7, as illustrated in FIG. 5a, at a large measuring distance, particularly in the case of non-cooperative targets, even though this does not appear to be the case after analog-to-digital conversion at point B of FIG. 1.

Figure 2B:
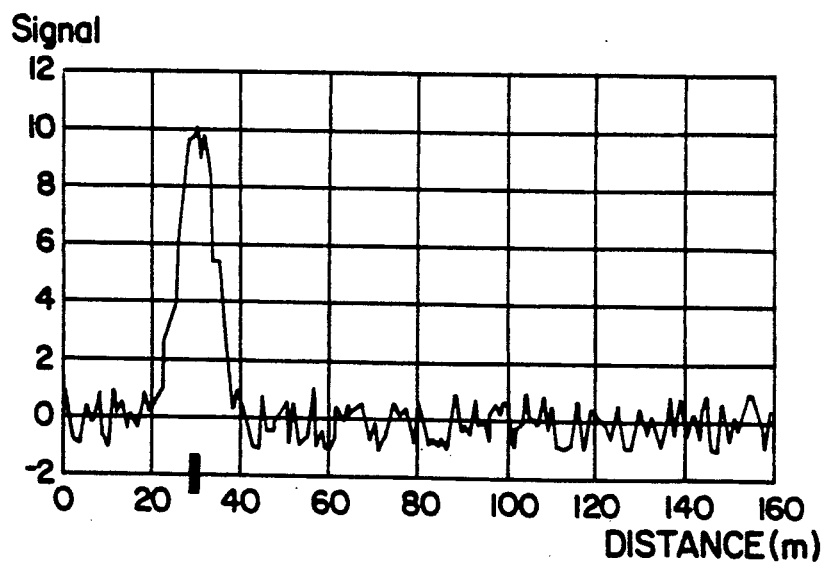
FIG. 2b illustrates an analog delay signal of a laser delay-type range finder at point A for a short distance (30 m)
Figure 3B:
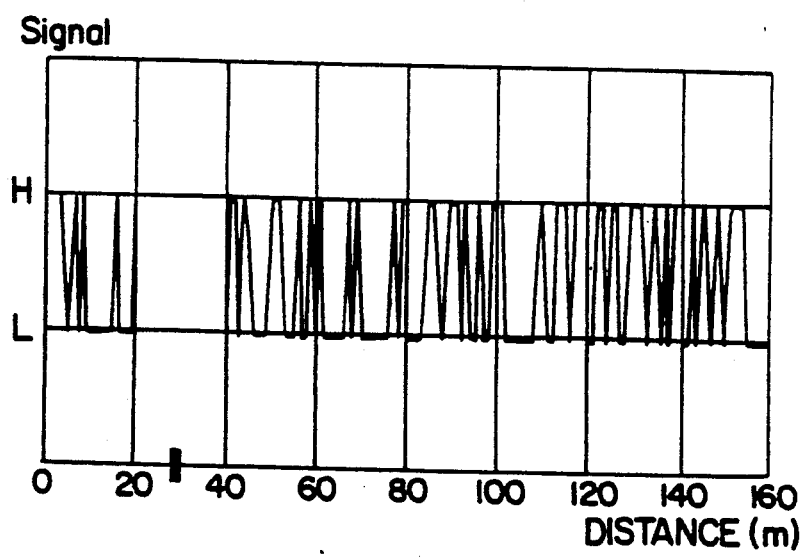
FIG. 3b illustrates a signal at point B of FIG. 1 after analog-to-digital conversion with the differentiating element switched out, for a short distance signal (30 m)
Figure 4A:
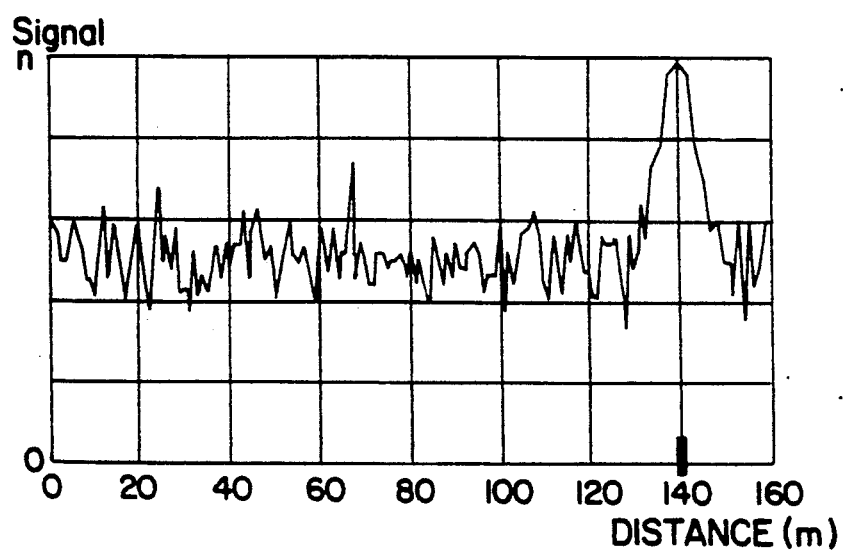
FIGS. 4a and 4b illustrate long and short distance output signals of the parallel adder, at point C in FIG. 1, with the differentiating element switched out.
Figure 4B:
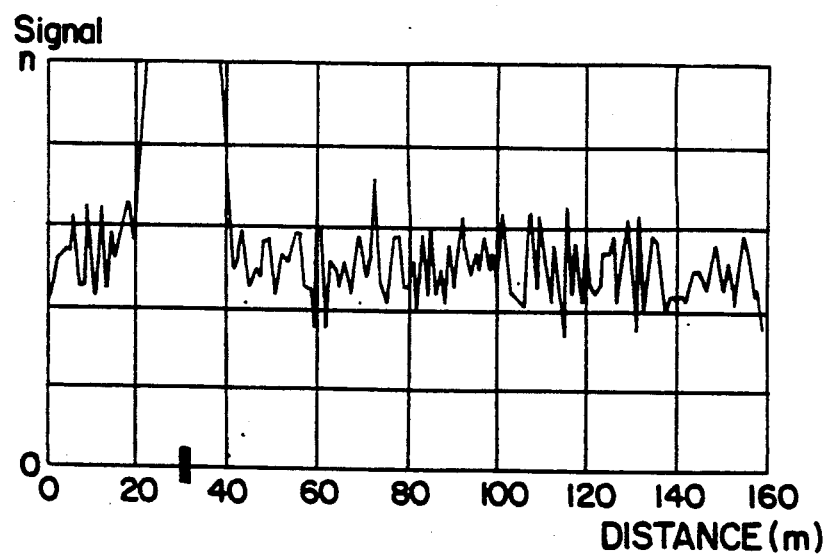
Figure 5B:
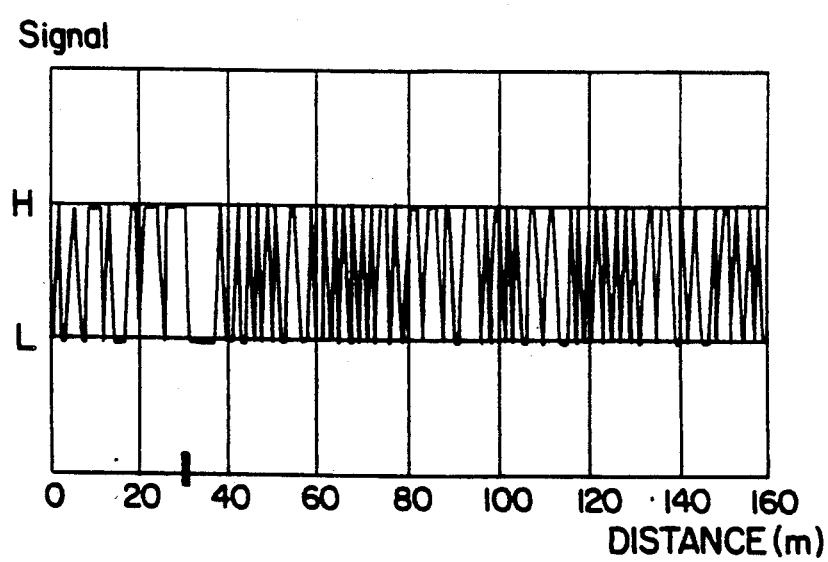

FIGS. 2b, 3b and 5b in each case illustrate signals corresponding to the signals illustrated in FIGS. 2a, 3a and 5a for received signals having a high signal-to-noise ratio such as would occur with a short measuring distance. At point C at the output of parallel adder 7, as illustrated in FIG. 5b, an overflow occurs, and an impairment to the position determination of the maximum occurs due to the limited number of bits. This inaccurate position determination problem is solved by the instant invention.

To solve the problems discussed above, the present invention provides a logical element 20 and a differentiating element 21, as illustrated in FIG. 1.

Both elements 20 and 21 are connected between the capacitor 4 and the analog-to-digital converter 6, preferably prior to the amplifier 5.

The logical element 20 is a self-holding threshold-value switch which provides a direct connection between point A and the amplifier 5 as long as the received signal at point A does not exceed a particular threshold value. If the threshold value is not exceeded, the system functions as described above. If the threshold value is exceeded, the logical element 20 switches the differentiating element 21 into the signal line from point A to the amplifier 5 and holds this switching state. The results of differentiating the received signals are illustrated in FIGS. 5a and 5b, and 6a and 6b.

For the received signal of FIG. 2b for a short distance measurement with a high amplitude signal and low noise, the signal variation of FIG. 5b, instead of the signal variation of FIG. 3b, is obtained at point B after analog-to-digital conversion. At point C after the parallel adder 7, the FIG. 6b signal is obtained with differentiation instead of the FIG. 4b signal.

Figure 6A:
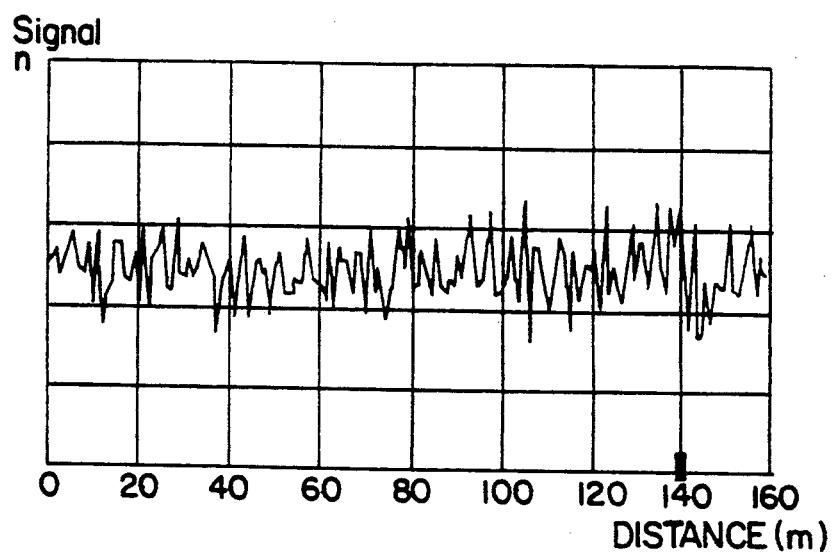
Figure 6B:
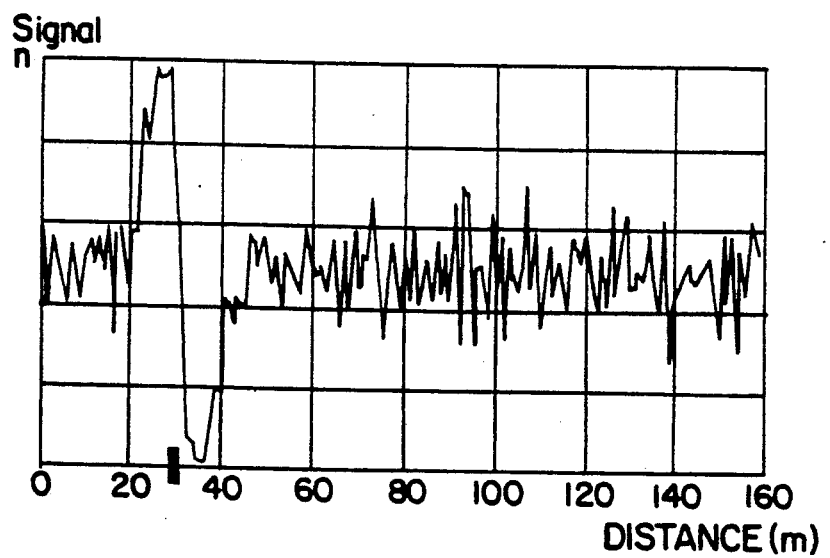

As illustrated in FIG. 6b, the effect of the differentiating element 21 is generation of a steep transition through the mean value of the noise, the position of which can be determined very accurately. Switching-in the differentiating element 21 results in a distinct improvement. This result can be seen by a comparison of FIG. 4b with FIG. 6b. In FIG. 6b the zero-crossing accurately indicates the time delay and thus the distance, whereas in FIG. 4b the maximum is off-scale and therefore can not be accurately determined.

The differentiating element 21 is switched out of the signal processing path by the logical element 20 when the input signal has a small amplitude and corresponds to a long distance. The differentiating element 21 is switched out because the input signal of FIG. 2a leads to the signal variations of FIG. 5a at point B after analog-to-digital conversion and of FIG. 6a at point C after the parallel adder 7 when the differentiating element 21 is switched in. The transition through the mean value of the noise in FIG. 6a at the point corresponding to the maximum in FIG. 2a has been virtually submerged in noise. Therefore better results are obtained for small signal amplitudes when the received signal is not differentiated.

Thus, the combination of the logical element 20 with the differentiating element 21 permits both large and small input signals to be optimally evaluated.

The evaluating device 10 is designed such that, when the differentiating element 21 is switched in, the evaluating device determines the channel in which a basic level corresponding to a mean value of noise between the two extremes, different from the noise, of the signal C summed together in parallel adder 7 is present. If the evaluating device 10 operates in accordance with a correlation method or interpolation, significant changes are not required to accommodate the correlation method or interpolation except that memory 11 should provide a nominal data field corresponding to a differentiated signal or an interpolation function. Switching evaluating device 10 or memory 11 is effected by logical element 20 simultaneously with switching differentiating element 21.

The dynamic range of the analog-to-digital converter 6 is selected such that the range is greater than the mean value of the amount of noise at its input point A and the digitizing step size is large enough to permit the noise to produce a zero value output signal for statistically half the time. In the preferred embodiment with a 1-bit analog-to-digital converter, the mean value of the noise in the output signal is accordingly 0.5.

For optimum utilization of the two signal evaluating methods, that is signal evaluation with and without differentiation, the threshold value of the logical element 20 is set at a signal amplitude which is within a range of two to ten times the mean amplitude of the noise at point C. In this regard, the number of bits of the analog-to-digital converter 6 must be taken into consideration. To determine the threshold, the analog-to-digital converter 6 can be connected to the logical element 20 and have an additional n+1 bit which is not forwarded to parallel adder 7. When this bit is set by the input signal, the logical element 20 switches in the differentiating element 21.

The differentiating element 21 can be simply constructed as an RC element at the input of the amplifier 5 to form a differentiating amplifier. The differentiating element 21 does not need to carry out accurate differentiation since the signal is split only into a few bits by the analog-to-digital converter 6.

System performance is enhanced if the logical element 20, at the same time the differentiating element 21 is switched in, also switches the sampling pulse generator 9 to an increased pulse rate. Thus, parallel adder 7, having a particular number of channels, is utilized efficiently for light pulses having a short delay by stretching the time scale, or the delay per channel, to further improve measuring accuracy.

The holding time for a switching state of the logical element 20 can be set to a fixed value, for example, to a duration of 50 light pulses. Performance is improved if the evaluating device 10 continuously evaluates the output signal of the parallel adder 7 and determines a measure of the uncertainty of the delay or distance value caused by noise, and compares this measure with a predetermined nominal value. If the measure drops below this predetermined nominal value, the measure value is output to the measurement value display 12, the measurement value memory 13, and/or the processor 14.

At the same time, the parallel adder 7 is reset to zero and the held switching state of the logical element 20 is released so that the next input signal pulse is again compared with the threshold value.

The measuring system can be constructed using various technologies and conventional components to provide as much integration as desired. For example, amplifier 5, analog-to-digital converter 6, parallel adder 7 and pulse generators 8 and 9 are commercially available in integrated circuit form. When implementing the system with integrated circuits, attention needs to be paid to the suitability of circuits for the required high frequency, that is approximately 100 MHz, operation.

A microprocessor 22 having a suitable clock frequency can be programmed such that the microprocessor implements elements 5 to 11, 20, and 21, the core of the pulse delay measuring system apart from transmitter 1, receiver 3, measurement value display 12 and the like. In this implementation, the delay of the light pulses from transmitter 1 via object 2 to receiver 3 determines the time scale necessary for data processing.

The foregoing description has been set forth merely to illustrate preferred embodiments of the invention and is not intended to be limiting. Modifications are possible without departing from the scope of the invention. Since modifications of the described embodiments incorporating the spirit and substance of the invention may occur to persons skilled in the art, the scope of the invention should be limited solely with respect to the appended claims and equivalents.

What is claimed is:

1. A pulse delay measuring circuit, comprising:
   a signal pulse transmitter generating first signal pulses to be bounced off an object;
   a receiver receiving said first signal pulses, after said first signal pulses have been bounced off said object, as second signal pulses;
   a logic circuit receiving said second signal pulses and comparing an amplitude of said second signal pulses with a predetermined value;
   a differentiating circuit, coupled to said logic circuit, to generate an output signal corresponding to a derivative of an input signal;
   an analog-to-digital converter converting inputted analog signals into digital signals;
   a parallel adder, coupled to said analog-to-digital converter, to sum said digital signals;
   a sampling pulse generator coupled to said analog-to-digital converter and to said parallel adder; and
   a trigger pulse generator, coupled to said signal pulse transmitter and to said parallel adder, to generate trigger pulses;
   said logic circuit switching in said differentiating circuit in between said receiver and said analog-to-digital converter to differentiate said second signal pulses for a duration of a plurality of trigger pulses when said amplitude of said second signal pulses is above said predetermined value, said logic circuit switching out said differentiating circuit at the end of said duration.

2. A pulse delay measuring circuit as set forth in claim 1, wherein:
   said signal pulse transmitter and said receiver process optical signals of a duration in the nanosecond range;
   said trigger pulse generator generates trigger pulses having a pulse rate in the kilohertz range; and
   said sampling pulse generator generates sampling pulses having a pulse rate in the megahertz range.

3. A pulse delay measuring circuit as set forth in claim 1, wherein said sampling pulse generator generates sampling pulses having two different pulse rates, one pulse rate resulting in a first sampling interval which approximately corresponds to a half-amplitude width of said first signal pulses and a second pulse rate resulting in a sampling interval no greater than half as long as said first sampling interval, said second pulse rate being applied to said analog-to-digital converter and said parallel adder when said differentiating circuit is switched in.

4. A pulse delay measuring circuit as set forth in claim 1, wherein a dynamic range of said analog-to-digital converter is greater than a mean value of noise at an input to said analog-to-digital converter, and a digitizing step size of said analog-to-digital converter is selected such that noise at said input to said analog-to-digital converter produces a zero value output signal for statistically half the time.

5. A pulse delay measuring circuit as set forth in claim 1, further comprising an evaluating circuit which evaluates contents of said parallel adder to determine a channel in which a pulse summed together in said parallel adder is maximum when said differentiating circuit is not switched in, and to determine a channel in which a basic level, corresponding to a mean value of noise between two extremes different from noise, of a signal summed together in said parallel adder is present when said differentiating circuit is switched in.

6. A pulse delay measuring circuit as set forth in claim 5 wherein said analog-to-digital converter processes more bits than are passed to said parallel adder and wherein non-passed bits are supplied to said logic circuit.

7. A pulse delay measuring circuit as set forth in claim 5, wherein said evaluating circuit evaluates said contents of said parallel adder in accordance with a correlation technique.

8. A pulse delay measuring circuit as set forth in claim 5, wherein said evaluating circuit evaluates said contents of said parallel adder in accordance with an interpolation technique.

9. A pulse delay measuring circuit as set forth in claim 5, wherein said evaluating circuit associates a particular channel with a delay, representing signal transmission time from said signal pulse transmitter via said object to said receiver, and with a distance between said object and said receiver and supplies said delay and said distance to at least one of a display, a memory, and a processor.

10. A pulse delay measuring circuit as set forth in claim 5, wherein said evaluating circuit generates for a particular channel a measure of uncertainty caused by noise and compares an actual value of said measure of uncertainty with a predetermined nominal value and, when said actual value drops below said predetermined nominal value, transmits particular channel information as a measurement value to at least one of a measurement value display, a measurement value memory, and a processor, and also resets said parallel adder to zero and releases a previously maintained switching state of said logic circuit.

11. A method of measuring a distance to an object, comprising the steps of:
 (a) generating first signal pulses to be bounced off said object;
 (b) receiving said first signal pulses, after said first signal pulses have been bounced off said object, as second signal pulses;
 (c) when an amplitude of said second signal pulses is above a predetermined value, differentiating said second signal pulses and supplying differentiated second signal pulses as an input to an analog-to-digital converter;
 (d) when an amplitude of said second signal pulses is not above said predetermined value, passing said second signal pulses through to said input to said analog-to-digital converter unchanged;
 (e) converting signal pulses at said input to said analog-to-digital converter into digital signals; and
 (f) summing said digital signals for a period of time to generate a sum and determining a time delay between generating said first signal pulses and receiving said second signal pulses using said sum.

12. A method as set forth in claim 11, wherein step (a) includes generating optical first signal pulses.

* * * * *